US005139836A

United States Patent [19]

Burke

[11] Patent Number: 5,139,836

[45] Date of Patent: Aug. 18, 1992

[54] TAG CONSTRUCTION

[75] Inventor: Brian K. Burke, New South Wales, Australia

[73] Assignee: Celcast Pty., Ltd., New South Wales, Australia

[21] Appl. No.: 484,422

[22] Filed: Feb. 23, 1990

[30] Foreign Application Priority Data

Feb. 24, 1989 [AU] Australia .............................. PJ2932

[51] Int. Cl.[5] .............................................. B32B 7/06

[52] U.S. Cl. ........................................ 428/42; 40/299; 493/961

[58] Field of Search ...................... 40/299; 428/41, 42, 428/43, 40, 961

[56] References Cited

U.S. PATENT DOCUMENTS 2,783,172 2/1957 Avery .............................. 428/41 X
4,010,354 3/1977 Apicella, Jr. et al. .......... 152/450 X
4,446,183 5/1984 Savagian .............................. 428/42
4,465,542 8/1984 Furihata .......................... 428/418 X
4,479,316 10/1984 Wippern .......................... 428/43 X
4,864,749 9/1989 Brown .................................. 40/299
4,865,921 9/1989 Hollenberg et al. ........... 428/458 X
4,925,716 5/1990 Haas ..................................... 428/41

FOREIGN PATENT DOCUMENTS 0034316 10/1981 European Pat. Off. .............. 428/41
8321865 12/1983 Fed. Rep. of Germany ........ 428/41
1372615 10/1974 United Kingdom .................. 428/42
1414777 11/1975 United Kingdom .................. 428/42

*Primary Examiner*—Henry F. Epstein
*Attorney, Agent, or Firm*—Ladas & Parry

[57] ABSTRACT

A tag assembly has a carrier sheet to which there is applied an adhesive. Covering the adhesive is a tag sheet which is cut to provide discrete tags which may be removed from the carrier sheet. The tags are adapted to receive printed material.

5 Claims, 1 Drawing Sheet

TAG CONSTRUCTION

TECHNICAL FIELD

The present invention relates to a method and construction of imagable (e.g. printable) tags.

BACKGROUND OF THE INVENTION

Computer printers are increasingly using sheet-fed paper, rather than folded paper. Identification tags for industrial or retail purposes have not heretofore been able to be fed through printers employing a sheet-fed system, however.

OBJECT OF THE INVENTION

It is the object of the present invention to overcome or substantially ameliorate the above disadvantages.

SUMMARY OF THE INVENTION

There is disclosed herein a tag assembly comprising:

a carrier sheet;

an adhesive applied to a major surface of said carrier sheet; and a tag sheet of heat stable plastics material covering said major surface, said tag sheet being cut to provide a plurality of discrete tags which are adapted to receive printed material and are removable from said carrier sheet.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
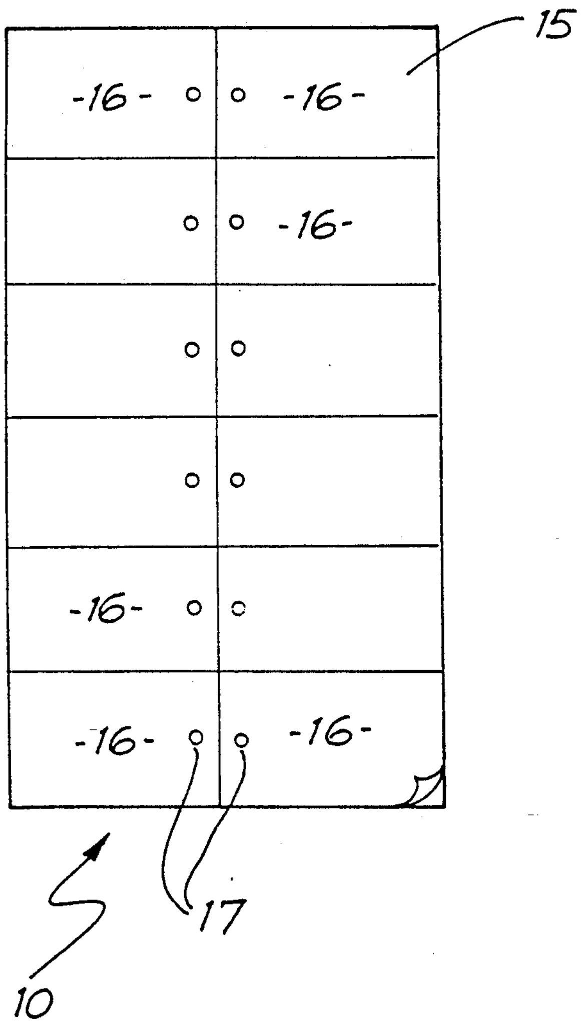
FIG. 1 is a schematic plan view of a tag assembly.
Figure 2:
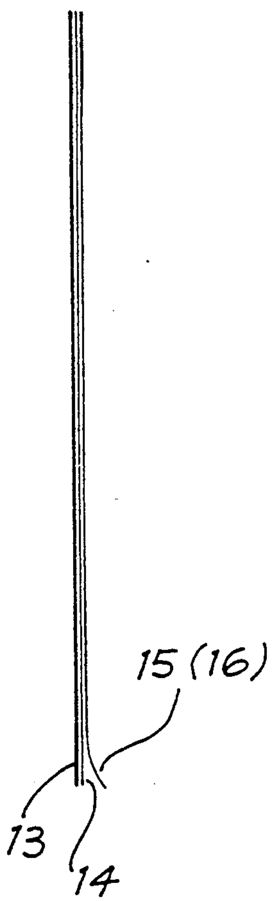
FIG. 2 is a schematic side elevation of the assembly of FIG. 1.

In the accompanying drawings there is schematically depicted a tag assembly 10. The tag assembly 10 is adapted to pass through sheet-feed "computer" printers.

The tag assembly 10 includes a carrier sheet 13 to a major surface of which there is supplied an adhesive 14. Covering the adhesive 14 is a tag sheet 15 of heat stable plastics material. The sheet 15 is dye cut so as to provide a plurality of individual tags 16. Still further, the sheet 15 could be cut to provide eyelets 17.

It should be appreciated that in the described embodiment, the tags 16 are of a rectangular configuration, but alternative tag configurations may be employed.

The adhesive 14 is adapted to be retained on the sheet 13 and not on the tag 16 when the tag is removed.

The tag assembly 10 is particularly adapted to receive bar code material. A further advantage of the above described preferred embodiment is that the tags can be produced in volume, and relatively quickly. Still further, high quality bar codes may be produced on the assembly 10. A still further example is that there is no residue or adhesive remaining on the tags.

What I claim is:

1. A tag assembly (10) comprising:

a generally rectangular carrier sheet (13) of flexible material for use in a sheet-feed printer;

an adhesive (14) applied to a major surface of said carrier sheet;

a tag sheet (15) of heat stable plastics material covering said major surface, said tag sheet (15) being cut to provide a plurality of discrete tags (16) which are adapted to receive printed material and are removable from said carrier sheet (13).

2. The tag assembly of claim 1 wherein each tag is also of rectangular configuration having its major length extending transverse of the major length of the carrier sheet.

3. The tag assembly of claim 1 wherein said tags are arranged in rows, which rows extend in the direction of the major dimension of the carrier sheet.

4. The tag assembly of claim 1 wherein each tag is provided with an aperture to facilitate securing of the tag to an object.

5. The tag assembly of claim 1 wherein said adhesive co-operates with the sheet and tags to stay with the sheet upon removal of the tags.

* * * * *